United States Patent Office 2,704,658
Patented Mar. 22, 1955

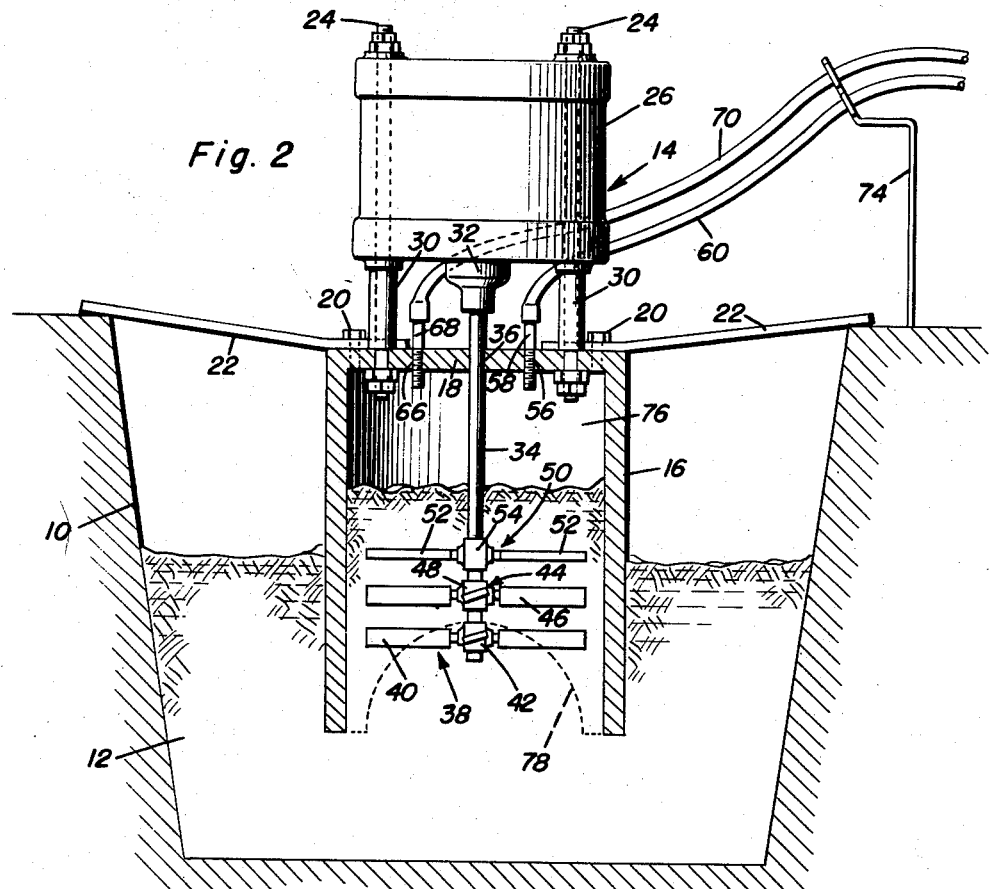

2,704,658

MUD AGITATOR

Kenneth J. Gordon, Dallas, Tex.

Application September 9, 1952, Serial No. 308,604

1 Claim. (Cl. 259—8)

This invention relates in general to means for agitating mud or drilling fluid utilized in the drilling operation of oil wells whereby gases entrapped in the well drilling fluid may be liberated for ease in detecting the same.

In the usual drilling procedures, quantities of mud or drilling fluid are pumped down through the drill pipe to be discharged through suitable apertures in the drill bit. This mud carries the removed rock, sand, etc. upwardly in the well around the drill pipe. The mud or well drilling fluid is normally a suspension of clay or other materials and water, with suitable materials added to control the properties of the mud. During the drilling operation the drill bit may pass through a narrow formation of oil or gas bearing sand and only a small amount of oil or gas will escape into the well drilling fluid. While there has been provided mechanisms for detecting minute quantities of gases, such as methane gas or petroleum vapor, the presence of the gases may not be ascertained due to their entrapment in the well drilling fluid. Therefore, it is desired to provide means for facilitating the liberation of the gases from the well drilling fluid.

The primary object of this invention is to provide an improved agitator which may be suspended in a ditch carrying well drilling fluid from a well being drilled in order that the same may be agitated to liberate gases entrapped therein.

Another object of this invention is to provide an improved agitator for use in detecting gas in well drilling fluids, said agitator having blades for simultaneously lifting and agitating well drilling fluid whereby the same is moved above the normal level of the surrounding well drilling fluid whereby gases entrapped therein are permitted to escape into a gas chamber in the upper portion of a housing forming the main support for the agitator.

A further object of this invention is to provide an improved agitator for liberating gases from well drilling fluids, said agitator being of a relatively compact design whereby the same is small in size and light in weight in order that the same may be conveniently transported.

A still further object of this invention is to provide an improved agitator which in cludes a housing having blading mounted therein, said housing being adapted to be disposed in a ditch having well drilling fluid passing therethrough, said housing having means attached thereto for suspending the same within the ditch above the bottom thereof, the means being engageable with the banks of the ditch.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application and in which:

Figure 1 is a perspective view of the mud agitator, which is the subject of this invention, and shows the same disposed in a ditch having well drilling fluid flowing therethrough, said mud agitator being connected to a gas detector and recorded; and Figure 2 is an enlarged transverse vertical sectional view taken substantially upon the plane indicated by the section line 2—2 of Figure 1 and shows the general construction of the agitator of Figure 1.

Similar characters of reference designate similar or identical elements and portions throughout the specification and throughout the different views of the drawings.

Referring now to the drawings in detail, it will be seen that there is illustrated a generally trapezoidal cross sectional ditch 10 which has well drilling fluid 12 flowing therethrough. Also disposed in the ditch 10 with a lower portion thereof submerged in the well drilling fluid 12 is the mud agitator, which is the subject of this invention, the mud agitator being referred to in general by the reference numeral 14.

As is best illustrated in Figure 2, the mud agitator 14 includes a generally cylindrical housing 16 which has a closed upper end 18 and an open bottom, the open bottom of the housing 16 permitting the upward flow of well drilling fluid 12 therein. Adjustably connected to the closed upper end 18 of the housing 16 by fasteners 20 are a plurality of support arms 22, the support arms extending outwardly from the housing 16 with their outer ends being supported upon the banks of the ditch 10. It will be noted that the relationship of the support arms 22 with respect to the banks of the ditch 10 is such that the lower portion of the housing 16 is submerged within the well drilling fluid 12.

Secured to the housing 16 by a plurality of elongated bolts 24 whose lower ends are connected to the closed upper end 18 thereof is an electric motor 26. It will be noted that the bottom of the electric motor 26 is spaced vertically above the closed upper end 18 due to the provision of spacers 30 carried by the elongated bolts 24 and positioned between the lower side of the motor 26 and the upper surface of the closed upper end 18.

Coupled to the drive shaft of the electric motor 26 by a coupling 32 is a shaft 34. The shaft 34 extends through a bore 36 in the closed upper end 18 and is journaled in the same. Secured to the shaft 34 adjacent the lower end thereof is a first set of blades which are referred to in general by the reference numeral 38. The set of blades 38 have their individual blades 40 positioned at an angle to the horizontal whereby well drilling fluid 12 disposed within the housing 16 is simultaneously agitated and urged upwardly. It will be noted that there are four such blades 40 and that the same are positioned at right angles to each other and secured to the shaft 34 by a collar 42.

Positioned above the first set of blades 38 is a second set of blades 44. The second set of blades 44 are identical to the first set of blades and includes four blades 46 which are at right angles to each other and connected to the shaft 34 by a collar 48.

It will be noted that the first and second sets of blades 38 and 44, respectively, are disposed below the level of the well drilling fluid 12 disposed in the ditch. Also carried by the shaft 34, but positioned above the level of the well drilling fluid 12 is a third set of blades 50, the third set of blades includes a pair of aligned blades 52 which lie in a horizontal plane and are connected to the shaft 34 by a collar 54. It will be understood that inasmuch as the blades 52 lie in a horizontal plane that the same merely agitate the well drilling fluid 12 lifted within the housing 16 by the first and second set of blades 38 and 44, respectively.

Threadedly engaged in a threaded bore 56 through the closed upper end 18 and extending therethrough is a tubular fitting 58. The tubular fitting 58 has connected to the upper end thereof a flexible conduit 60 which is in turn connected to a first fitting 62 of a gas detecting and recording apparatus, which is referred to in general by the reference number 64. It will be understood that the gas detecting and recording apparatus 64 is conventional equipment and need not be explained in more detail.

Also extending through the closed upper end 18 and threadedly engaged in a threaded bore 66 is a second tubular fitting 68. The second tubular fitting 68 has connected thereto a flexible conduit 70 which extends adjacent the flexible conduit 60 and is connected to a second fitting 72 of the gas detecting and recording mechanism 64. In order that the conduits 60 and 70 may be supported intermediate their ends, there is provided a support bracket 74 which may be engaged in the ground intermediate the agitator 14 and the gas detecting and recording mechanism 64.

It will be understood that there is associated with the flexible conduit 60 a compressor (not shown). As well drilling fluid 12 containing trapped gases therein pass through the ditch 10 the same is agitated by the agitator 14 and the gases are liberated and flow upwardly into the gas chamber portion 76 in the upper part of the housing 16. The action of the compressor then draws the trapped gases in through the flexible conduit 60 and forces the same into the gas detecting and recording mechanism 64. Fresh air is forced back into the gas chamber 76 of the housing 16 through the flexible conduit 70 and the tubular fitting 68. Inasmuch as fresh air is continuously circulated through the housing 16, the gases liberated from the well drilling fluid 12 are continuously circulated through the flexible conduit 60 whereby there is no accumulation of gases within the housing.

In order that the entrance and removal of the well drilling fluid 12 with respect to the housing 16 may be facilitated, the upstream side of the housing 16 has an enlarged semi-circular opening 78 formed therein at the lower end thereof. The well drilling fluid 12 enters through the enlarged opening 78 and passes upwardly through the housing 16 due to the action of the blading mounted therein. In order to insure the raising of the well drilling fluid 12 within the housing 16 to a level above the normal level of the well drilling fluid, the outlet for the well drilling fluid is in the form of an elongated generally rectangular window 80 formed in the downstream side of the housing 16, the window 80 being positioned above the level of the surrounding well drilling fluid 12.

It is proposed that the various elements of the agitator 14 be made of lightweight materials, such as aluminum, whereby the same may be easily handled and transported. Furthermore, by making the agitator light in weight the support arms 22 may be made of relatively light materials.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claim.

Having described the invention, what is claimed as new is:

Apparatus for use in separating gas from well drilling fluid flowing in an open ditch comprising a housing having a side wall, a closed top end and an open lower end, support arms carried by said housing for positioning same in an open ditch through which is flowing well drilling fluid with the open end of said housing submerged below the level of the well drilling fluid, said side wall being cut out at one part adjacent the open end to define an inlet and being cut out at an opposite part to define an outlet, said outlet being a predetermined distance above said inlet, said housing defining a gas chamber above said outlet opening, agitator means including a drive shaft and a plurality of blades centrally positioned within said housing to direct well drilling fluid through said housing and separate gas therefrom, a drive motor, means mounting said motor on said housing in spaced relation from said closed end, said drive shaft projecting through said closed end and connected to be driven by said motor, and means attached to said housing and in communication with said gas chamber for removing gas separated from well drilling fluid passing through said housing by virtue of the operation of said agitator means.

References Cited in the file of this patent

UNITED STATES PATENTS

| | | |
|---|---|---|
| 1,721,553 | Haines | July 23, 1929 |
| 2,338,174 | Garrison | Jan. 4, 1944 |
| 2,358,679 | Zacher | Sept. 19, 1944 |
| 2,370,817 | Shanley | Mar. 6, 1945 |
| 2,400,046 | Hummel | May 7, 1946 |
| 2,514,690 | Bliss et al. | July 11, 1950 |